Oct. 6, 1959 F. E. CONLY 2,907,998
PORTABLE SIGNAL LIGHT
Filed July 20, 1956 2 Sheets-Sheet 1
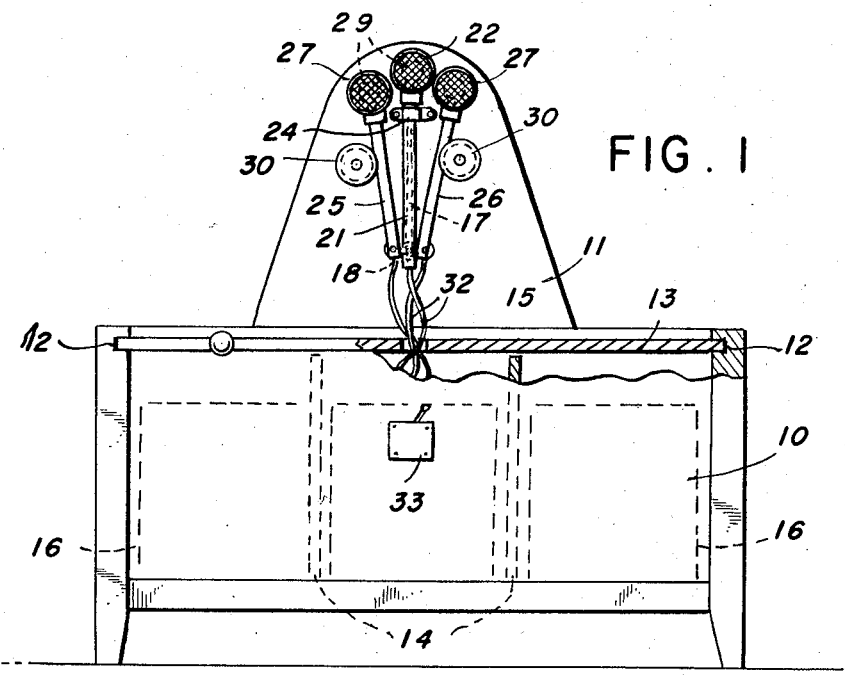
FIG. 1
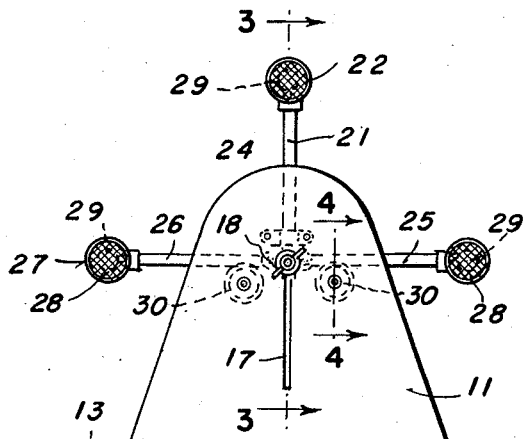
FIG. 2
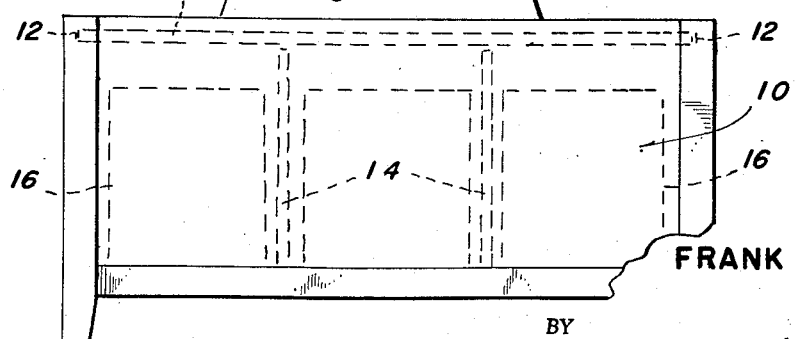
INVENTOR
FRANK E. CONLY
BY
*J. B. Wickman Jr.*
ATTORNEY Oct. 6, 1959 — F. E. CONLY — 2,907,998
PORTABLE SIGNAL LIGHT
Filed July 20, 1956 — 2 Sheets-Sheet 2
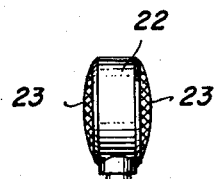
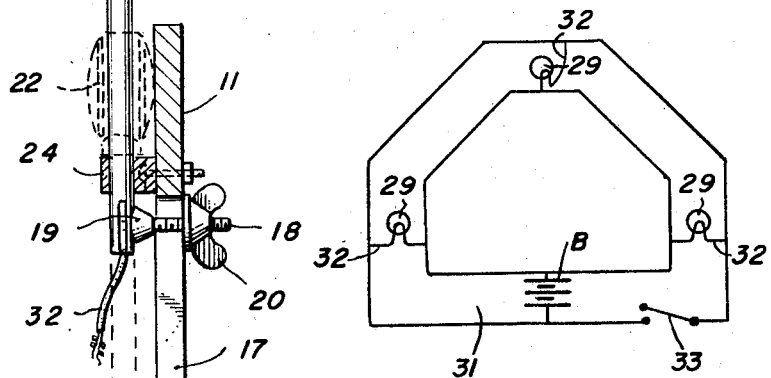
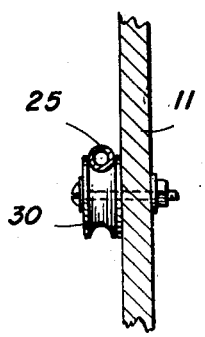
INVENTOR
FRANK E. CONLY United States Patent Office 2,907,998
Patented Oct. 6, 1959

2,907,998
PORTABLE SIGNAL LIGHT

Frank E. Conly, Jackson Heights, N.Y.

Application July 20, 1956, Serial No. 599,050

1 Claim. (Cl. 340—366)

The present invention relates to a portable signal light and particularly to a portable flashing danger light for vehicles, indicating that a vehicle is stalled on, or alongside of a highway.

In traveling streets and highways, a vehicle may develop mechanical trouble, or a tire may blow-out. Either of the two enumerated troubles necessitates the driver getting out of the vehicle to make necessary repairs. With the great flow of traffic on the streets and highways, a driver of a vehicle that has stopped for repairs is subjected to the possibility of being injured by moving traffic especially at night, and unless the vehicle carries a warning signal light to indicate that the vehicle is stalled, the driver may be seriously injured by the moving traffic. Therefore it is an object of the invention to provide a signal light that will warn drivers that the vehicle is stalled and thus prevent damage to the stalled vehicle and injury to the driver.

Another object of the invention is to provide a signal light that is compact and light in weight.

A further object of the invention is the provision of arms equipped with flashing lights.

A still further object of the invention is the provision of means for locking the arms in operative and inoperative position.

A still further object of the invention is the provision of means for pivotal movement of some of the arms.

A still further object of the invention is the provision of guide means for the arms in their movement to operative and inoperative positions.

A still further object of the invention is the provision of a portable signal device that may be stored in a vehicle and occupying a minimum of space.

These and other objects and novel features of my invention will be more clearly set forth in the following specification and claim.

A preferred embodiment of the invention is illustrated in the accompanying drawings in which:

Figure 1 is a front elevational view of the device, the signal arms being shown in inoperative position.

Figure 2 is a rear elevational view of the device, the signal arms shown in operative position.

Figure 3 is a view taken on line 3—3 of Figure 2 showing the signal lights in locked operative position, parts being shown in section and fragmentary, the dotted lines indicating the inoperative position of the signal arms.

Figure 4 is a fragmentary sectional view taken on line 4—4 of Figure 2, illustrating one of the pivotal arms and roller guide means for same.

Figure 5 is a diagrammatic view of the wiring circuit for the device illustrated.

Referring to the drawings, the numeral 10 represents a casing or housing of wood, plastic or other suitable material, having a raised back or panel portion 11. The casing is provided with grooves 12 that receive a removable top 13, and partitions 14 that divide the casing into compartments 15 for housing batteries 16 shown in dotted lines. The raised back 11 is provided with a vertical slot 17 midway its sloping sides in which rides a threaded bolt 18, one end of the bolt being secured to a wing bracket 19, the threaded end of the bolt carrying a locking wing nut 20, that locks the signal arms in inoperative and operative position.

Rigidly connected to the wing bracket 19 is tubular arm 21 having a circular detachable head 22 that is provided with red translucent closures 23, and these closures may be made of plastic or glass. The tubular arm 21 is guided in its upward and downward movement by strap-bracket 24 that is secured to the raised back 11. Tubular arms 25 and 26 are pivotally connected at their lower ends to wing bracket 19. Each of the arms 25 and 26 have a detachable circular head 27, and each is provided with translucent closures 28 that may be of plastic or glass. The heads 22 and 28 each carry flasher light bulbs 29.

Mounted for rotative movement on the raised back 11 are guide rollers 30, that are engaged by the arms 25 and 26 during movement of the arms to operative and inoperative position.

The flasher light bulbs 29 are connected into the circuit 31 by wires 32, as shown diagrammatically in Fig. 5. Mounted on the casing or housing 10 is a switch 33, said switch closing the circuit when it is desired to light the lamps. Battery B supplies the power.

In use of the device the arms 21, 25 and 26 are in an inoperative position as shown in Figure 1, and they are locked in this position by the wing nut 20. When it becomes necessary to use the device, the wing nut 20 is loosened, and the arms moved upwardly to the position shown in Figure 2, the wing nut is then tightened, locking the arms in operative position. During movement of the arms, arm 21 is guided by the strap bracket 24, while the arms 25 and 26 are guided by the grooved rollers 30. When in operative position the switch 33 is moved to on position and current then flows to the bulbs 29. The bulbs having a flasher unit built into the bulbs, an intermitting flash of light will be given off by the bulbs.

I desire to have it understood that obvious changes may be made within the scope of the following claim without departing from the spirit of my invention.

What is claimed is:

A portable signal light comprising a housing having a back portion, compartments in said housing, batteries in said compartments, a cover for enclosing said batteries in said compartments, an electric signalling device on said back portion mounted for slidable movement into and out of operative position, other electrical signalling devices pivotally connected to said first named signalling device, means on said back portion for guiding said signal devices during said slidable movement in and out of said operative position, locking means on said first named signalling device adapted to lock said signalling devices in any desired position, all of said signalling devices connected to said batteries.

References Cited in the file of this patent

UNITED STATES PATENTS

| | | |
|---|---|---|
| 2,375,121 | McClellan | May 1, 1945 |
| 2,564,145 | Beall et al. | Aug. 14, 1951 |
| 2,564,170 | Nusbaum et al. | Aug. 14, 1951 |